United States Patent
Murakami

(10) Patent No.: US 9,651,932 B2
(45) Date of Patent: May 16, 2017

(54) NUMERICAL CONTROL DEVICE FOR CONTROLLING FIVE-AXIS PROCESSING MACHINE

(71) Applicant: FANUC Corporation, Minamitsuru-gun, Yamanashi (JP)

(72) Inventor: Hiroki Murakami, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 350 days.

(21) Appl. No.: 14/324,355

(22) Filed: Jul. 7, 2014

(65) Prior Publication Data
US 2015/0012127 A1 Jan. 8, 2015

(30) Foreign Application Priority Data
Jul. 8, 2013 (JP) .................. 2013-142810

(51) Int. Cl.
G06F 19/00 (2011.01)
G05B 19/25 (2006.01)
G05B 19/19 (2006.01)
G05B 19/408 (2006.01)

(52) U.S. Cl.
CPC ......... *G05B 19/19* (2013.01); *G05B 19/4083* (2013.01); *G05B 2219/36265* (2013.01); *G05B 2219/40477* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 2008/0288103 A1* | 11/2008 | Otsuki | G05B 19/404 700/189 |
| 2009/0157218 A1 | 6/2009 | Otsuki et al. | |
| 2012/0271446 A1* | 10/2012 | Sato | G05B 19/4166 700/108 |
| 2012/0330456 A1* | 12/2012 | Tsuda | G05B 19/4061 700/186 |
| 2013/0060373 A1* | 3/2013 | Otsuki | G05B 19/404 700/114 |

FOREIGN PATENT DOCUMENTS

| | | |
|---|---|---|
| JP | H07-334228 A | 12/1995 |
| JP | 2003-195917 A | 7/2003 |
| JP | 2005-182437 A | 7/2005 |
| JP | 2005-352876 A | 12/2005 |
| JP | 2009-146152 A | 7/2009 |
| JP | 2012-022546 A | 2/2012 |

OTHER PUBLICATIONS

Notification of Reasons for Refusal (along with its English-language translation) issued in Japan Patent Application No. 2013-142810 dated Dec. 9, 2014.

* cited by examiner

*Primary Examiner* — Mohammad Ali
*Assistant Examiner* — Md Azad
(74) *Attorney, Agent, or Firm* — Drinker Biddle & Reath LLP

(57) ABSTRACT

A numerical control device for controlling a five-axis processing machine includes a tool-direction instruction correction unit, and corrects a tool-direction vector so that a tool direction of a processing program smoothly changes. The tool-direction instruction correction unit refers to a tool-direction correction tolerance set in advance by a tool-direction correction tolerance setting unit.

3 Claims, 8 Drawing Sheets

FIG.1
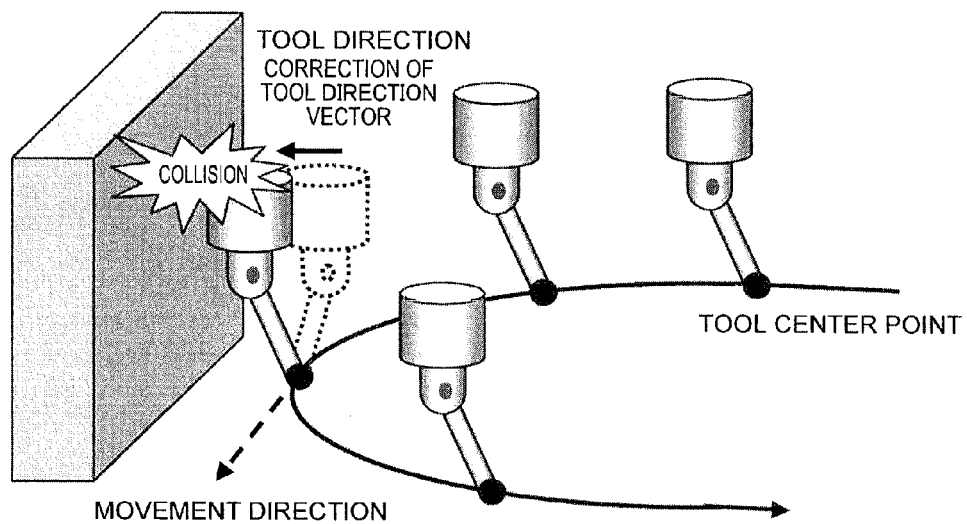
FIG.2
<PROGRAM INSTRUCTION EXAMPLE>
G aa ;
X Px1 Y Py1 Z Pz1 I Pi1 J Pj1 K Pk1 ;
X Px2 Y Py2 Z Pz2 I Pi2 J Pj2 K Pk2 ;
X Px3 Y Py3 Z Pz3 I Pi3 J Pj3 K Pk3 ;
X Px4 Y Py4 Z Pz4 I Pi4 J Pj4 K Pk4 ;
X Px5 Y Py5 Z Pz5 I Pi5 J Pj5 K Pk5 ;
X Px6 Y Py6 Z Pz6 I Pi6 J Pj6 K Pk6 ;
X Px7 Y Py7 Z Pz7 I Pi7 J Pj7 K Pk7 ;
X Px8 Y Py8 Z Pz8 I Pi8 J Pj8 K Pk8 ;
X Px9 Y Py9 Z Pz9 I Pi9 J Pj9 K Pk9 ;
X Px10 Y Py10 Z Pz10 I Pi10 J Pj10 K Pk10 ;
G bb ;
FIG.3
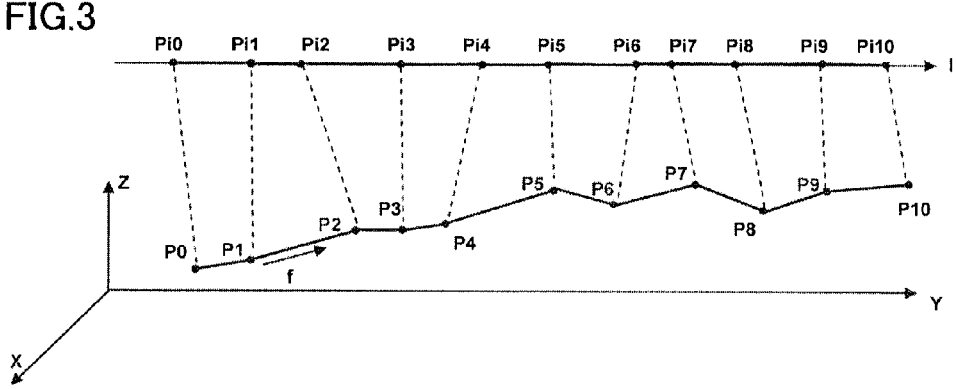

<PROGRAM INSTRUCTION EXAMPLE>

G aa ;
X Px1 Y Py1 Z Pz1 B Pb1 C Pc1 ;
X Px2 Y Py2 Z Pz2 B Pb2 C Pc2 ;
X Px3 Y Py3 Z Pz3 B Pb3 C Pc3 ;
X Px4 Y Py4 Z Pz4 B Pb4 C Pc4 ;
X Px5 Y Py5 Z Pz5 B Pb5 C Pc5 ;
X Px6 Y Py6 Z Pz6 B Pb6 C Pc6 ;
X Px7 Y Py7 Z Pz7 B Pb7 C Pc7 ;
X Px8 Y Py8 Z Pz8 B Pb8 C Pc8 ;
X Px9 Y Py9 Z Pz9 B Pb9 C Pc9 ;
X Px10 Y Py10 Z Pz10 B Pb10 C Pc10 ;
G bb ;

NUMERICAL CONTROL DEVICE FOR CONTROLLING FIVE-AXIS PROCESSING MACHINE

RELATED APPLICATION DATA

This application claims priority under 35 U.S.C. §119 and/or §365 to Japanese Application No. 2013-142810 filed Jul. 8, 2013, the entire contents is incorporated herein by reference.

BACKGROUND OF THE INVENTION

1. Field of the Invention

The present invention relates to a numerical control device for controlling a five-axis processing machine that processes a workpiece attached to a table by the use of three linear axes and two rotation axes.

2. Description of the Related Art

In a case where a workpiece is processed by a five-axis processing machine, a processing technique is generally used which also interpolates a tool direction while interpolating a tool center point movement path based on an instructed relative movement speed between the workpiece and a tool with respect to a movement instruction of a tool center point in the movement path and the tool direction, and causes the tool center point to move along an instructed movement path at an instructed speed while changing the tool direction. Such an instruction and a processing technique are called a tool center point control, and a program instruction is generally created by CAM.

JP-A 2003-195917 discloses a technique which corrects a movement path interpolation point while interpolating a movement path and a tool direction of a tool center point based on a relative movement speed between a workpiece and a tool with respect to the movement instruction of the tool center point and drives a servo motor so that the tool center point, moves along an instructed movement path at an instructed speed.

JP-A 2005-182437 discloses a technique which interpolates a curve in which a processing point is generated from an instruction point sequence so that the curve changes along a curve in which a vector end point indicating a tool direction is generated from an instructed vector sequence from the point sequence instructing a tool center point movement path and the vector sequence instructing the tool direction. JP-A 2009-146152 discloses a technique involving with a tool-direction instruction correction unit for correcting a tool-direction instruction so that a movement amount ratio between two rotation axes and a linear axis becomes uniform. Further, JP-A 2009-146152 represents a case where a tool direction does not proportionally change, but largely changes with respect to a length of a linear axis instruction as a tool center point movement path of a program created by CAM.

A position which is offset from the tool center point in the tool direction by the tool length is referred to as a control point. In a case where the tool center point is controlled so that the tool center point follows the instructed movement path, a change in the tool direction for each block is added to the control point while being amplified by the tool length. For this reason, in a case where a large change occurs in a tool-direction vector, the movement of the control point is not necessarily smooth even when the tool center point instruction path is smooth. When the control point movement path is not smooth, there is a need to abruptly accelerate or decelerate a servo motor so that the tool center point follows the path. As a result, a bad influence arises in that the processing time extends or the surface quality of the workpiece is degraded.

In the tool-direction instruction correction unit disclosed in JP-A 2009-146152, a rotation axis instruction is directly corrected. For this reason, it is not possible to control the correction direction of the tool-direction vector. For example, when the correction amount in the processing-surface normal direction increases in the processing using the tool side surface, the workpiece is cut more than needs, so that the surface quality of the workpiece is degraded. Further, when the correction amount increases in the direction with a barrier such as a machine, there is a possibility that the tool and the machine may interfere with each other as illustrated in FIG. 1.

SUMMARY OF THE INVENTION

Therefore, an object of the invention is to provide a numerical control device for controlling a five-axis processing machine that corrects a tool-direction vector so that a correction amount in a designated direction decreases in a tool center point control and suppresses an unnecessary acceleration/deceleration of a machine in a processing state to shorten a processing time and improve the surface quality of a processing surface of a workpiece.

According to the invention, there is provided a numerical control device configured to control a five-axis processing machine including three linear axes and two rotation axes and configured to process a workpiece attached to a table, the numerical control device including: an instruction reading unit configured to read a movement path instruction of the linear axis, a relative movement speed instruction between the workpiece and a tool, and a tool length and a tool-direction instruction as the tool direction with respect to the table; a tool-direction correction tolerance setting unit configured to set a tool-direction correction tolerance as a threshold value for correcting the tool direction; a tool-direction instruction correction unit configured to correct the tool-direction instruction so that the tool-direction instruction becomes within the tool-direction correction tolerance; an interpolation unit configured to obtain each axis position every interpolation period so that a tool center point moves along an instructed movement path at an instructed relative movement speed based on the relative movement speed instruction, the movement path instruction, and the tool-direction instruction corrected by the tool-direction instruction correction unit; and a unit configured to drive each axis motor so that; the axis motor moves to each axis position obtained by the interpolation unit.

The tool-direction instruction may be instructed as a tool-direction vector and the tool-direction instruction correction unit may correct the instructed tool-direction vector. Alternatively, the tool-direction instruction may be instructed by the positions of two rotation axes and the tool-direction instruction correction unit may correct the positions of two instructed rotation axes. Further, the tool-direction instruction correction unit may convert the positions of two instructed rotation axes into the tool-direction vectors, correct the converted tool-direction vectors, and reversely convert the corrected tool-direction vectors into the positions of the two rotation axes.

The tool-direction correction tolerance may be given as I, J, and K for X, Y, and Z directions respectively and the tool-direction instruction correction unit may correct the tool-direction instruction so as to cause the tool-direction instruction to become within the designated tool-direction correction tolerance.

Alternatively, the tool-direction correction tolerance may be given as a tool-movement-direction tolerance and a processing-surface-normal-direction tolerance and the tool-direction instruction correction unit may correct the tool-direction instruction so as to cause the tool-direction instruction to become within the tool-movement-direction tolerance and the processing-surface-normal-direction tolerance.

Alternatively, the tool-direction correction tolerance may be given as an arbitrary-direction tolerance and the tool-direction instruction correction unit may correct the tool-direction instruction so as to cause the tool-direction instruction to become within the arbitrary-direction tolerance.

When a tool-direction instruction correction mode is instructed, the instruction reading unit may estimate a predetermined number of blocks as a correction subject program instruction until the cancellation of the tool-direction instruction correction mode is instructed, and the tool-direction instruction correction unit may correct the tool-direction instruction of the correction subject program instruction. Further, the tool-direction instruction correction mode may be instructed by a G-code command and the cancellation of the tool-direction instruction correction mode may be instructed by a different G-code command.

Since the invention has the above-described configuration, it is possible to provide a numerical control device for controlling a five-axis processing machine that corrects a tool-direction vector so that a correction amount in a designated direction decreases in a tool center point control and suppresses an unnecessary acceleration/deceleration speed of a machine in a processing state to thereby shorten a processing time and improve the surface quality of a processing surface of a workpiece.

BRIEF DESCRIPTION OF THE DRAWINGS

The above-described object, the other object, and the feature of the invention will be proved from the description of embodiments below with reference to the accompanying drawings. In these drawings:

FIG. 1 is a diagram illustrating interference between a tool and a machine in the related art.

FIG. 2 is an example of a processing program instruction of a first embodiment.

FIG. 3 is a diagram illustrating a comparison between a position instruction and a tool-direction instruction when the position instructions P1 (Px1, Py1, and Pz1) to P10 (Px10, and Pz10) in the X, Y, and Z axes are illustrated in the coordinate of X, Y, and Z and the tool-direction instructions $Pi_1$ to $Pi_{10}$ of I are illustrated in a one-dimensional coordinate.

DETAILED DESCRIPTION OF THE PREFERRED EMBODIMENTS

First Embodiment

Tool Center Point Processing

Figure 4:
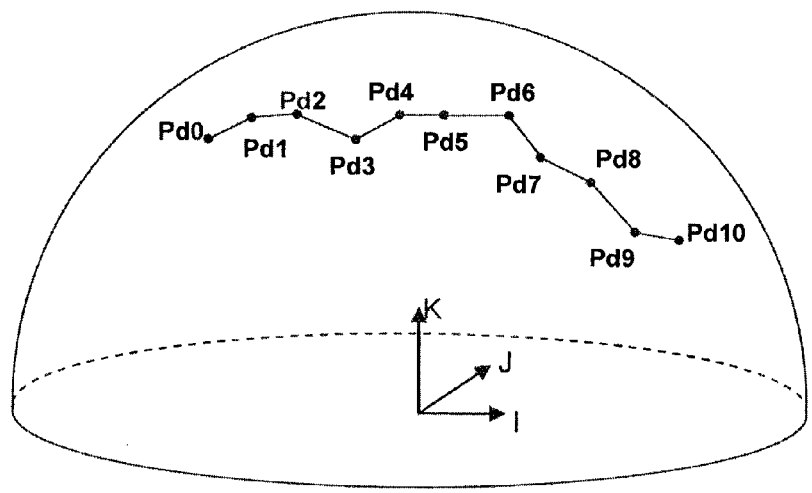
FIG. 4 is a diagram illustrating a tool-direction vector end in the space of I, J, and K.

As one embodiment, an example of a program instruction illustrated in FIG. 2 will be described. When a tool-direction instruction correction mode is selected, blocks are estimated as correction subject program instructions by a maximum estimation block number and tool-direction instructions are corrected so that a ratio between a linear axis movement amount and a tool-direction vector change amount of the blocks in the estimated correction subject program instructions becomes uniform until the tool-direction instruction correction mode is cancelled. Furthermore, the maximum estimation block number is set as a separate parameter.

Here, Gaa indicates a G-code command that instructs the tool-direction instruction correction mode, and Gbb indicates a G-code command that releases the tool-direction instruction correction mode. The tool direction is instructed as the normalized tool-direction vectors of I, J, and K defined in the X, Y, and Z directions respectively.

A method of instructing the tool direction as the tool-direction vector is disclosed in JP-A 2003-195917. A relative movement speed f between a tool and a workpiece in the tool center point movement path instructed by X, Y, and Z is instructed already as a modal instruction Ef until Gaa is instructed.

It is assumed that the position instructions in the X, Y, and Z axes of the blocks and the tool-direction instructions of I are set as illustrated in FIG. 3. FIG. 3 illustrates a comparison between the position instruction and the tool-direction instruction when the position instructions P1 (Px1, Py1, and Pz1) to P10 (Px10, Py10, and Pz10) in the X, Y, and Z axes are shown in the coordinate of X, Y, and Z and the tool-direction instructions Pi1 to Pi10 of I are shown in a one-dimensional coordinate. In FIG. 3, the X-element I of the tool-direction vector is representatively described, but the same applies to the elements J and K. P0 (Px0, Py0, and Pz0) indicates the positions of the axes when Gaa is instructed. Pi0, Pj0, and Pk0 indicate the elements X, Y, and Z of the tool-direction vector defined at the positions of two rotation axes when Gaa is instructed.

Accordingly, the X-element I of the tool-direction vector changes from $Pi_0$ to $Pi_{10}$, the Y-element J of the tool-direction vector changes from $Pj_0$ to $Pj_{10}$, and the Z-element K of the tool-direction vector changes from Pk0 to Pk10 while the tool center point moves at the speed f from P0 (Px0, Py0, and Pz0) to $P_{10}$ (Px10, Py10, and Pz10).

While the tool center point moves at the speed f from P0 (Px0, Py0, and Pz0) to P1 (Px1, Py1, and Pz1) in each block, the X-element I of the tool-direction vector changes from $Pi_0$ to $Pi_1$, the Y-element J moves from Pj0 to Pj1, and the Z-element K moves from $Pk_0$ to $Pk_1$. Then, while the tool center point moves at the speed f from P1 (Px1, Py1, and Pz1) to P2 (Px2, Py2, and Pz2), the X-element I of the tool-direction vector changes from Pi1 to Pi2, the Y-element J of the tool-direction vector changes from Pj1 to Pj2, and the Z-element K of the tool-direction vector changes from Pk1 to Pk2. In this way, the elements I, J, and K change while being synchronized with the movement of the tool center point at each block.

FIG. 4 illustrates the tool-direction vector end points Pd0 (Pi0, Pj0, and Pk0) to Pd10 (Pi10, Pj10, and Pk10) in the space of I, J, and K. Since $Pd_0$ to Pd10 are normalized vectors, the vector designates points on a sphere with radius of 1. An example is described in which ten blocks of instructions exist from Gaa to Gbb, but the number of the blocks is not limited. Each axis position instruction is set as an absolute instruction.

Here, a ratio between the linear axis movement amount and the change amount of each element of the tool-direction vector at each block is expressed by the equations (1) to (3). Furthermore, in the equations (1) to (3), n indicates 0 to 9.

$$\frac{|Pi_{n+1} - Pi_n|}{|P_{n+1} - P_n|} \quad (1)$$

$$\frac{|Pj_{n+1} - Pj_n|}{|P_{n+1} - P_n|} \quad (2)$$

$$\frac{|Pk_{n+1} - Pk_n|}{|P_{n+1} - P_n|} \quad (3)$$

The ratio between the linear axis movement amount and the change amount of each element of the tool-direction vector at each block is not uniform normally. Therefore, Pi1 to Pi10. Pj1 to Pj10, and Pk1 to Pk10 are corrected as below so that the ratio becomes uniform.

The numerical control device starts an estimation process and a correction process when Gaa is read. Here, the estimation block number is set to 5 at maximum. The corrected instructions I, J, and K are indicated by Ri1 to Ri10, Rj1 to Rj10, and Rk1 to Rk10. The tool-direction vectors of which only the directions are corrected are indicated by Qi1 to Qi10, Qj1 to Qj10, and Qk1 to Qk10.

The tool-direction correction tolerances in the positive direction of I, J, and K, that is, the elements X, Y, and Z of the tool-direction vector respectively, are indicated by Ti, Tj, and Tk, the tool-direction correction tolerances in the negative direction of I, J, and K, that is, the elements X, Y, and Z of the tool-direction vector respectively, are indicated by Si, Sj, and Sk. The tool-direction correction tolerances have, in advance, threshold values with which correct the tool direction by the tool-direction correction tolerance setting unit. The tool-direction correction tolerances may be set as the parameters by an operator or may be set as the program instructions.

Hereinafter, the correction process will be described according to the sequence thereof.

<1> As in the equation (4), the first block is read and the first block is not corrected.

$$R\alpha_1 = Q\alpha_1 = P\alpha_1$$

$$(\alpha = i, j, k) \quad (4)$$

Furthermore, a becomes i, j, and k as below.

<2> The second and third blocks are read and $Q\alpha_2$ is calculated as in the equation (5).

$$Q\alpha_2 = R\alpha_1 + \frac{|P_2 - P_1|}{\sum_{m=1}^{3} |P_m - P_{m-1}|} * (P\alpha_3 - P\alpha_0) \quad (5)$$

<3> As in the equation (6), the maximum correction amount is set when the correction amount exceeds the upper-limit value (the tool-direction correction tolerance), When $Q\alpha2-P\alpha2>T\alpha, Q\alpha2=P\alpha2+T\alpha$.

When $P\alpha2-Q\alpha2>S\alpha, Q\alpha2=P\alpha2-S\alpha$. (6)

<4> As in the equation (7), the instructions I, J, and K ($Q\alpha2$) of the corrected second block are normalized. These are set as the corrected instructions I, J, and K ($R\alpha2$).

$$R\alpha_2 = \frac{Q\alpha_2}{\sqrt{Qi_2^2 + Qj_2^2 + Qk_2^2}} \quad (7)$$

<5> The (n+1)th and (n+2)th blocks are read, and the instructions I, J, and K of the nth block are corrected as in the equation (8) (n=3 to 8). Here, the (n+1)th block is read already at n=4 to 8.

$$Q\alpha_n = R\alpha_{n-1} + \frac{|P_n - P_{n-1}|}{\sum_{m=n-2}^{n+2} |P_m - P_{m-1}|} * (P\alpha_{n+2} - R\alpha_{n-3}) \quad (8)$$

<6> When the correction amount exceeds the upper-limit value (the tool-direction correction tolerance), the maximum correction amount is set as shown in the equation (9).

When $Q\alpha n - P\alpha n > T\alpha, Q\alpha n = P\alpha n + T\alpha$.

When $P\alpha n - Q\alpha n > S\alpha, Q\alpha n = P\alpha n - S\alpha$. (9)

<7> The instructions I, J, and K ($Q\alpha_n$) of the corrected nth block are normalized as in the equation (10).

$$R\alpha_n = \frac{Q\alpha_n}{\sqrt{Qi_n^2 + Qj_n^2 + Qk_n^2}} \quad (10)$$

<8> The new block is not read when Gbb is read. As in the equation (11), the instructions I, J, and K of the ninth block, are corrected.

$$Q\alpha_9 = R\alpha_8 + \frac{|P_9 - P_8|}{\sum_{m=8}^{10} |P_m - P_{m-1}|} * (P\alpha_{10} - R\alpha_7) \quad (11)$$

<9> When the correction amount exceeds the upper-limit value (the tool-direction correction tolerance), the maximum correction amount is set as in the equation (12).

When $Q\alpha9 - P\alpha9 > T\alpha, Q\alpha9 = P\alpha9 + T\alpha$.

When $P\alpha9 - Q\alpha9 > S\alpha, Q\alpha9 = P\alpha9 - S\alpha$. (12)

<10> The instructions I, J, and K (Qα9) of the corrected ninth block are normalized as in the equation (13).

$$Ra_9 = \frac{Q\alpha_9}{\sqrt{Qi_9^2 + Qj_9^2 + Qk_9^2}} \qquad (13)$$

<11> The tenth block is not corrected as in the equation (14).

$$R\alpha_{10} = Q\alpha_{10} = P\alpha_{10} \qquad (14)$$

In this way, the tool-direction instruction is corrected while sequentially estimating the block. That is, it is assumed that Ri1 to Ri10, Rj1 to Rj10, and Rk1 to Rk10 are instructed to Pi1 to Pi10, Pj1 to Pj10, and Pk1 to Pk10 in the program instruction example indicated by FIG. 2.

Figure 5:
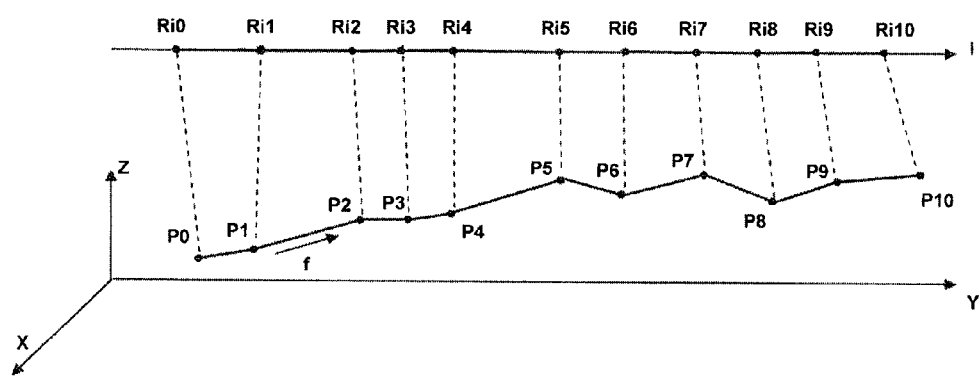
FIG. 5 is a diagram illustrating a state where the position instructions in the X, Y, and Z axes are illustrated in the coordinate of X, Y, and Z and the tool-direction instructions of I are illustrated in a one-dimensional coordinate.
Figure 6:
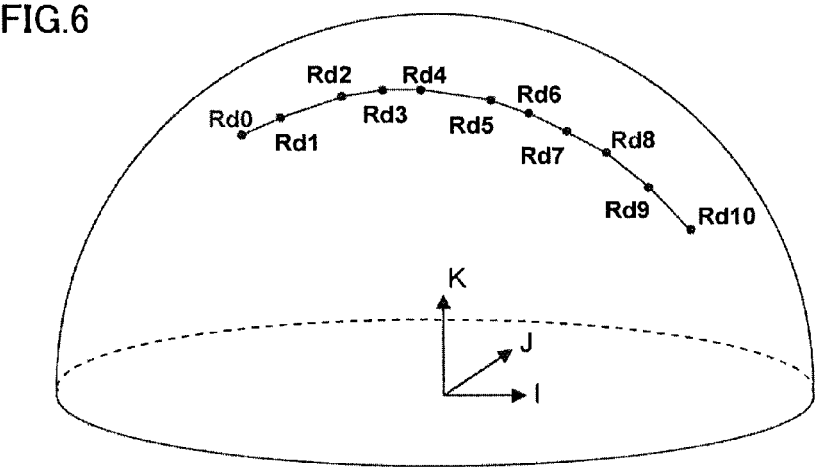
FIG. 6 is a diagram illustrating a state where the locus of the tool-direction vector Pdn in the space of I, J, and K illustrated in FIG. 3 is corrected to Rdn.

The tool-direction instructions Pi1 to Pi10 of I illustrated in FIG. 2 are corrected as Ri1 to Ri10 illustrated in FIG. 5 by the tool-direction instruction correction, and the locus of the tool-direction vector Pdn in the space of I, J, and K illustrated in FIG. 3 is corrected as Rdn illustrated in FIG. 6. Here, Rdn (n=1 to 10) is the corrected tool-direction vector end (Rin, Rjn, and Rkn). Even when all blocks are not corrected without being read completely, a change in each element of the tool-direction vector of each block may be corrected so that the change is substantially proportional to the corresponding linear axis movement amount.

Furthermore, since the interpolation unit for obtaining each axis position every interpolation period so that the tool center point moves along the instructed movement path at the instructed speed based on the relative movement speed instruction, the movement path instruction, and the tool-direction instruction corrected by the tool-direction instruction correction unit and the unit for driving each axis motor to each axis position obtained by the interpolation unit are known in the existing technique, the description thereof will, not be provided.

Second Embodiment

Tool Side Surface Processing

In the first embodiment, an example is illustrated in which the tool-direction correction tolerance is applied to the I, J, and K directions. Here, an example of a method is illustrated in which the tool-direction correction tolerance is applied in the tool movement direction and the processing-surface normal direction in the tool side surface processing. The program or the estimation method is the same as that of the first embodiment.

The movement instructions in the X, Y, and Z axes of the nth block before the correction are set as Pn (Pxn, Pyn, and Pzn), and the tool-direction vectors before the correction are set as Pdn (Pin, Pjn, and Pkn). The program instruction is set as the same value as that of the first embodiment, and $Pd_n$ is set as the unit vector.

The unit vector Un in the tool movement direction of the nth block is expressed by the equation (15).

$$U_n = \begin{pmatrix} Ux_n \\ Uy_n \\ Uz_n \end{pmatrix} = \frac{P_n - P_{n-1}}{|P_n - P_{n-1}|} \qquad (15)$$

Here, Un and Pdn are linearly independent from each other.

In the case of the tool side surface processing, the unit vector Vn of the processing-surface normal direction is expressed by the equation (16).

$$V_n = \begin{pmatrix} Vx_n \\ Vy_n \\ Vz_n \end{pmatrix} = \frac{Pd_n \times U_n}{|Pd_n \times U_n|} \qquad (16)$$

Further, the unit vector Wn perpendicular to U and V is expressed by the equation (17).

$$W_n = \begin{pmatrix} Wx_n \\ Wy_n \\ Wz_n \end{pmatrix} = U_n \times V_n \qquad (17)$$

Figure 7:
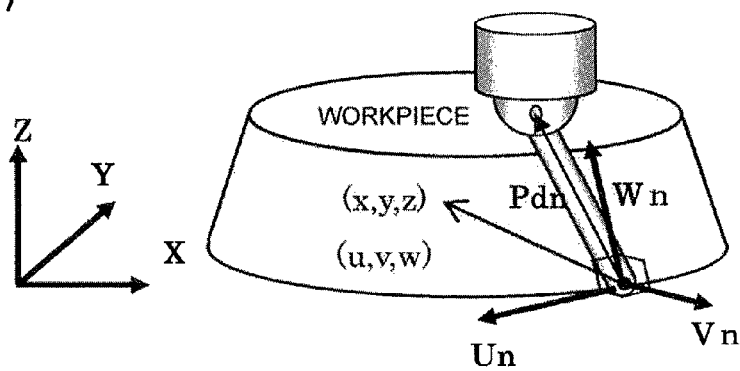
FIG. 7 is a diagram illustrating a coordinate system in which an axis $U_n$ matches the tool movement direction and an axis $V_n$ matches the processing-surface normal direction.

As illustrated in FIG. 7, Un, Vn, and Wn are unit vectors perpendicular to one another. In the coordinate system defined by Un, Vn, and Wn, the axis Un matches the tool movement direction, and the axis Vn matches the processing-surface normal direction.

The conversion from the coordinate system of X, Y, and Z into the coordinate system of Un, Vn, and Wn is expressed by the equation (18) when the coordinate values of the coordinate system of X, Y, and Z are set as (x, y, z) and the coordinate values of the coordinate system of Un, Vn, and Wn are set as (u, v, w).

$$\begin{pmatrix} u \\ v \\ w \end{pmatrix} = \begin{pmatrix} Ux_n & Uy_n & Uz_n \\ Vx_n & Vy_n & Vz_n \\ Wx_n & Wy_n & Wz_n \end{pmatrix} \begin{pmatrix} x \\ y \\ z \end{pmatrix} = M_n \begin{pmatrix} x \\ y \\ z \end{pmatrix} \qquad (18)$$

The coordinate conversion of each Qαn is performed by the equation (19) before the consideration of the tool-direction correction tolerance of each point of the first embodiment shown in the equation (6), the equation (9), and the equation (12).

$$\begin{pmatrix} Qi'_n \\ Qj'_n \\ Qk'_n \end{pmatrix} = M_n \begin{pmatrix} Qi_n \\ Qj_n \\ Qk_n \end{pmatrix} \qquad (19)$$

When Qαn' subjected to the coordinate conversion is normalized in consideration of the tool-direction correction tolerance as in the first embodiment instead of Qαn of the equation (6), the equation (9), and the equation (12), the corrected tool-direction vectors (Rin', Rjn', and Rkn') are obtained instead of (Rin, Rjn, and Rkn).

As the tool-direction correction tolerance used for the correction herein, the tool-direction correction tolerance Ti' in the positive direction of the axis $U_n$ and the tool-direction correction tolerance Si' in the negative direction of the axis Un are used instead of Ti and Si, and the tool-direction correction tolerance Tj' in the positive direction of the axis Vn and the tool-direction correction tolerance Sj' in the negative direction of the axis $U_n$ are used instead of Tj and Sj. Ti' and Si' indicate the tool-movement-direction tolerances, and Tj' and Sj' indicate the processing-surface-normal-direction tolerances. The tool-direction correction tolerance in the We direction may be considered, but in the embodiment, the tool-direction correction tolerance in the Wn direction is not considered.

When (Rin', Rjn', and Rkn') are reversely converted by the equation (20), the corrected tool-direction vectors (Rin, Rjn, and Rkn) are obtained in consideration of the tool-direction correction tolerances in the Un and Vn directions.

$$\begin{pmatrix} Ri_n \\ Rj_n \\ Rk_n \end{pmatrix} = M_n^{-1} \begin{pmatrix} Ri'_n \\ Rj'_n \\ Rk'_n \end{pmatrix} \quad (20)$$

Figure 8:
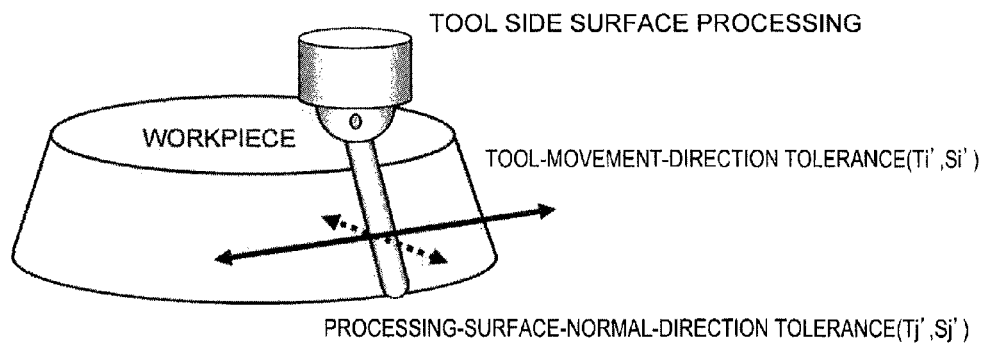
FIG. 8 is a diagram illustrating a tool-direction tolerance.

For example, in a case where the tool side surface processing is performed, when the tool-movement-direction tolerances (Ti' and Si') are set to large values and the processing-surface-normal-direction tolerances (Tj' and Sj') are set to small values as illustrated in FIG. 8, the tool-direction vector may be corrected while maintaining the processing shape. That is, the tool-direction vector may be corrected without notching or removing the processing shape too much.

Further, the tool-direction correction tolerance may be separately set in the positive direction (Ti, Tj, and Tk) and the negative direction (Si, Sj, and Sk) in the I, J, and K directions. For this reason, for example, when there is a high risk that an interference with respect to the machine occurs as a result of the correction of the tool-direction vector, the tool-direction vector may be corrected while preventing the interference with respect to the machine by setting the tool-direction correction tolerance in the interference direction to a small value.

Here, a method has been described in which the tool-direction correction tolerance is applied in the tool movement direction and the processing-surface normal direction. However, the tool-direction correction tolerance may be applied to an arbitrary direction by creating the coordinate conversion matrix Mn so that the axes Un, Vn, and Wn become the directions in which the tool-direction correction tolerance is considered.

Third Embodiment

A program instruction example of FIG. 9 will be described. The estimation method or the like is the same as that of the first embodiment. Here, the tool direction is instructed as the movement of the rotation axes B and C. The machine configuration is set as illustrated in FIG. 10 (n=1 to 10), Pcn is set to 0° to 360°, and Pbn is set to 0° to 90°.

The position instructions (Pbn and Pon) of the B and C axes of each block are converted into the tool-direction vectors (Pin, Pjn, and Pkn) by solving the equation (21), and the tool-direction vectors are corrected while sequentially estimating the blocks as in the first embodiment, thereby obtaining the corrected tool-direction vectors (Rin, Rjn, and Rkn).

$$\tan(Pc_n) = \frac{Pj_n}{Pi_n} \quad (21)$$

$$\tan(Pb_n) = \frac{\sqrt{(Pi_n)^2 + (Pj_n)^2}}{Pk_n}$$

-continued
$$(Pi_n)^2 + (Pj_n)^2 + (Pk_n)^2 = 1$$

As a result, the tool-direction vectors are corrected so that the change amount (Rin, Rjn, and Rkn) of each block is substantially proportional to the corresponding linear axis movement amount. The corrected tool-direction vectors (Rin, Rjn, and Rkn) are reversely converted into the position instructions (Rbn and Rcn) of the B and C axes by solving the equation (22).

$$Rc_n = \arctan\frac{Rj_n}{Ri_n} \quad (22)$$

$$Rb_n = \arctan\frac{\sqrt{(Ri_n^2 + Rj_n^2)}}{Rk_n}$$

$$(n = 1 \sim 10)$$

Figures 9, 10:
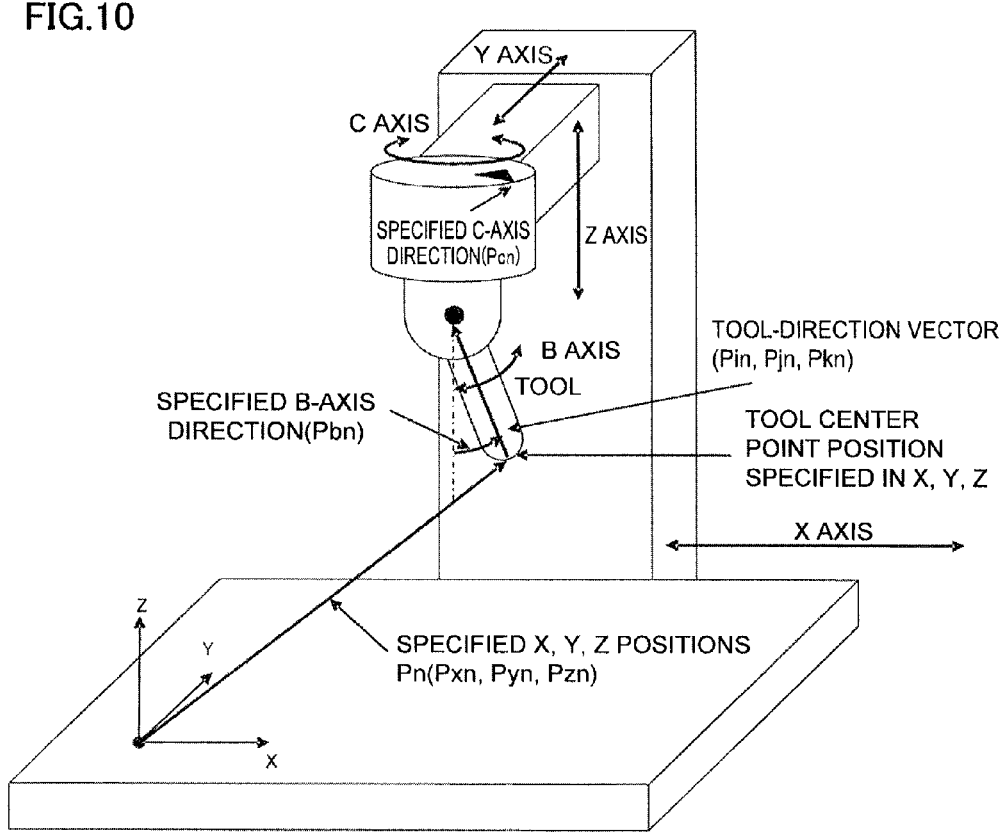
FIG. 9 is a program instruction example.
FIG. 10 is a diagram illustrating a machine configuration.

Then, it is assumed that Rb1 to Rb10 and Rc1 to Rc10 are instructed to Pb1 to Pb10 and Pc2 to Pc10 in the program instruction example illustrated in FIG. 9.

Figure 11:
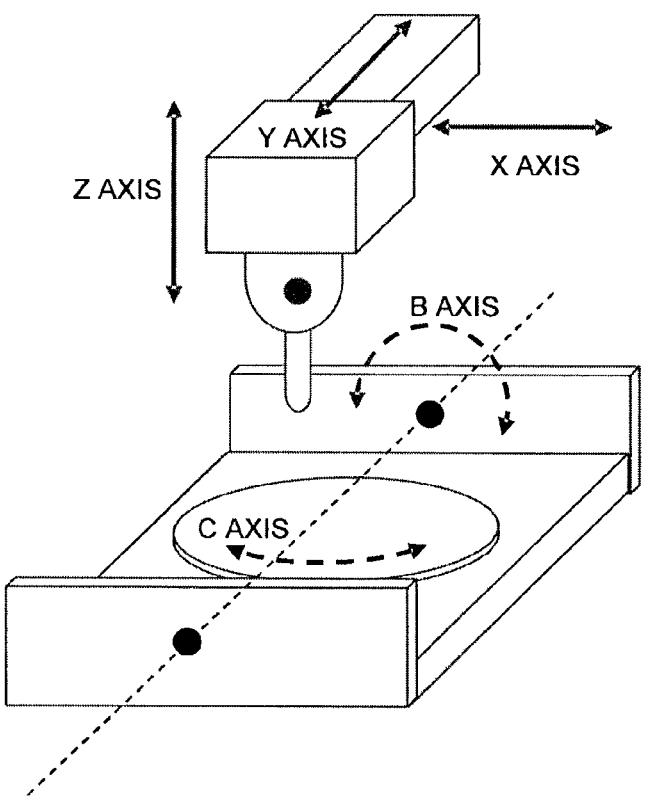
FIG. 11 is a diagram illustrating a table rotation type five-axis processing machine that rotates a table by two rotation axes.
Figure 12:
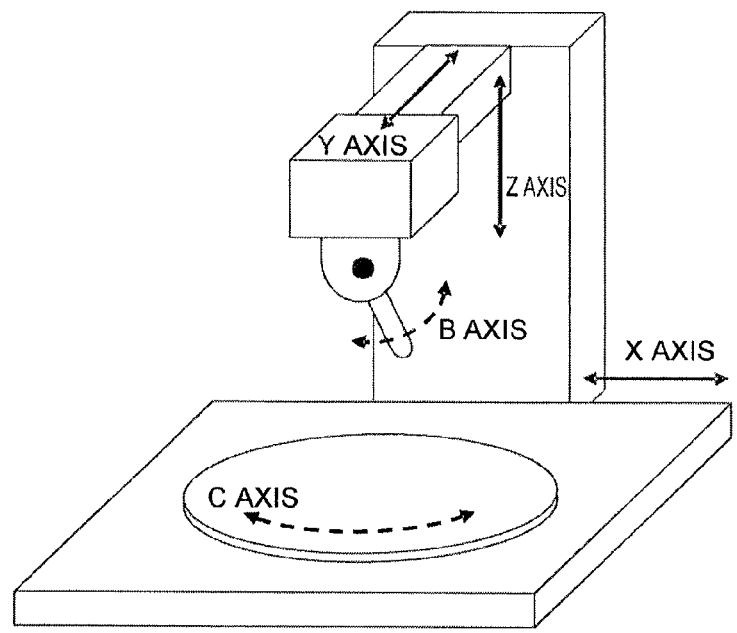
FIG. 12 is a diagram illustrating a combination type five-axis processing machine that rotates a tool head by one rotation axis and rotates a table by the other rotation axis.

Furthermore, a tool head rotation type machine illustrated in FIG. 10 has been described, but the five-axis processing machine may be configured as a table rotation type five-axis processing machine that rotates the table by two rotation axes as illustrated in FIG. 11 or a combination type five-axis processing machine that rotates a tool head by one rotation axis and rotates a table by the other rotation axis as illustrated in FIG. 12. Even in such a five-axis processing machine, the same method as those of the first embodiment, the second embodiment, and the third embodiment may be employed.

(Functional Block Diagram)

Figure 13:
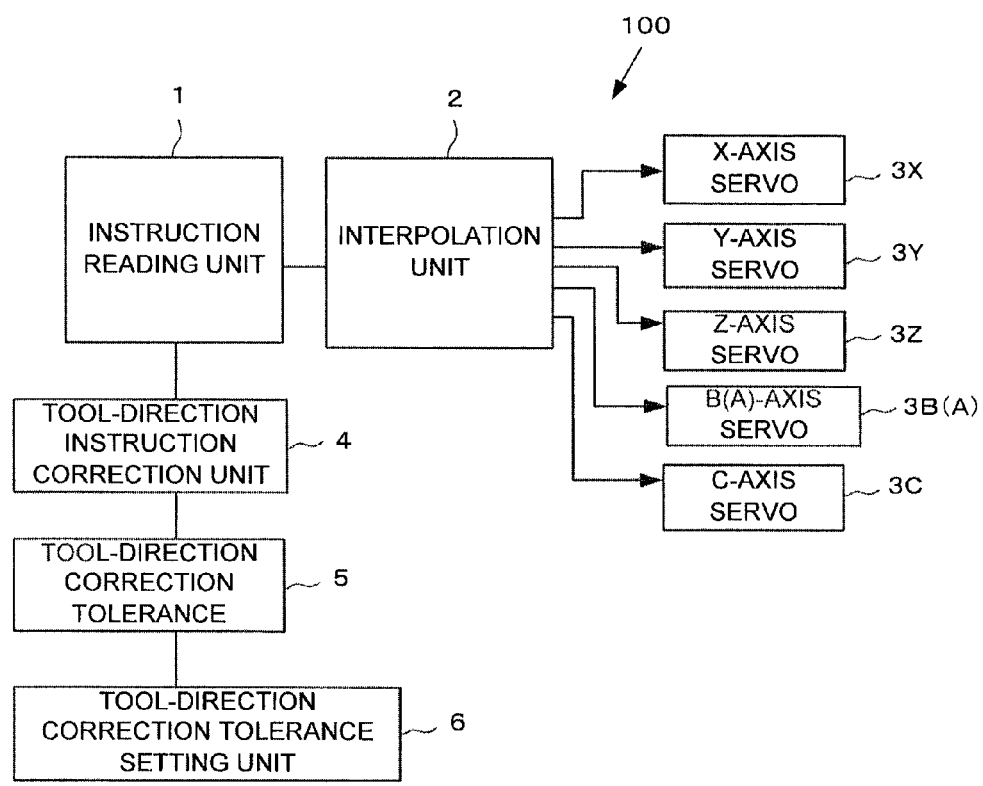
FIG. 13 is a functional block diagram.

FIG. 13 is a functional block diagram. In a numerical control device 100 that controls a five-axis processing machine, an instruction reading unit 1 analyzes a processing program and converts the processing program into an execution format. An interpolation unit 2 performs an interpolation process based on the execution format, outputs a movement instruction to each axis, and controls the driving state of the axis-servo, that is, an X-axis servo 3x, a Y-axis servo 3Y, a Z-axis servo 3Z, a B(A)-axis servo 3B (A), and a C-axis servo 3C based on the movement instructions of the axes.

The numerical control device 100 includes a tool-direction instruction correction unit 4 included in the instruction reading unit 1, and corrects the tool-direction vector so that the tool direction of the processing program smoothly changes. The tool-direction instruction correction unit 4 refers to a tool-direction correction tolerance 5 set in advance by a tool-direction correction tolerance setting unit 6.

(Flowchart)

Figure 14:
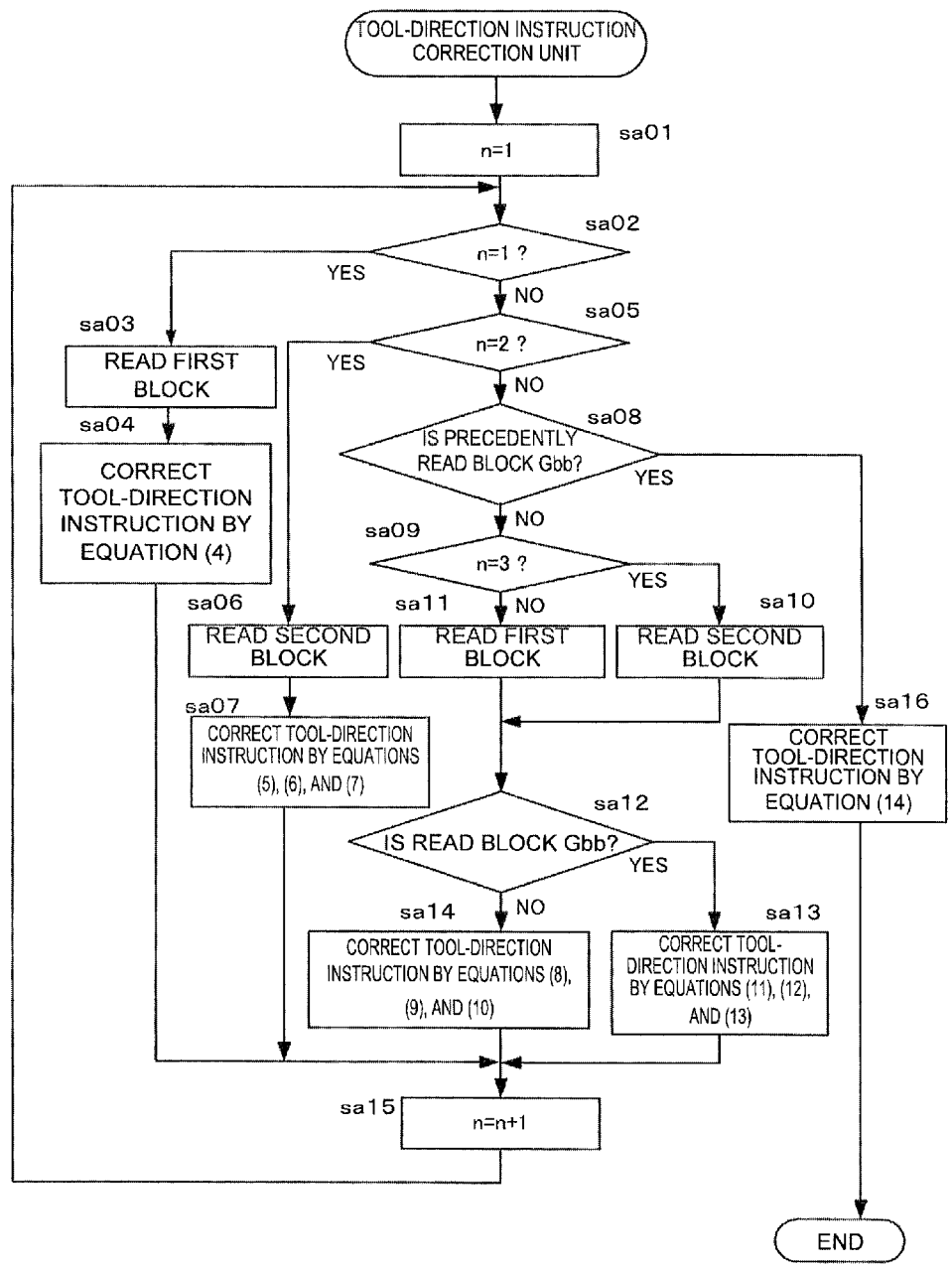
FIG. 14 is a flowchart illustrating a process of a tool-direction instruction correction unit.

FIG. 14 illustrates a process of the tool-direction instruction correction unit 4 after Gaa of the first embodiment is read based on a flowchart. It is assumed that at least five blocks are instructed between Gaa and Gbb. Hereinafter, this process will be described according to the steps.

[step sa01] n is set to 1.

[step sa02] It is determined whether n is 1. The routine proceeds to step sa03 when n is 1, and the routine proceeds to step sa05 when n is not 1.

[step sa03] First block is read.

[step sa04] The tool-direction instruction is corrected by the equation (4), and the routine proceeds to step sa15.

[step sa05] It is determined whether n is 2. The routine proceeds to step sa06 when n is 2, and the routine proceeds to step sa08 when n is not 2.

[step sa06] Second block is read.

[step sa07] The tool-direction instruction is corrected by the equation (5), the equation (6), and the equation (7), and the routine proceeds to step sa15.

[step sa08] It is determined whether the precedently read block is Gbb. The routine proceeds to step sa16 when the block is Gbb, and the routine proceeds to step sa09 when the block is not Gbb.

[step sa09] It is determined whether n is 3. The routine proceeds to step sa10 when n is 3, and the routine proceeds to step sa11 when n is not 3.

[step sa10] Second block is read, and the routine proceeds to step sa12.

[step sa11] First block is read, and the routine proceeds to step sa12.

[step sa12] It is determined whether the read block is Gbb. The routine proceeds to step sa13 when the block is Gbb, and the routine proceeds to step sa14 when the block is not Gbb.

[step sa13] The tool-direction instruction is corrected by the equation (11), the equation (12), and the equation (13), and the routine proceeds to step sa15.

[step sa14] The tool-direction instruction is corrected by the equation (8), the equation (9), and the equation (10), and the routine proceeds to step sa15.

[step sa15] n is updated to n+1, and the routine returns to step sa02.

[step sa16] The tool-direction instruction is corrected by the equation (14), and the process ends.

Figure 15:
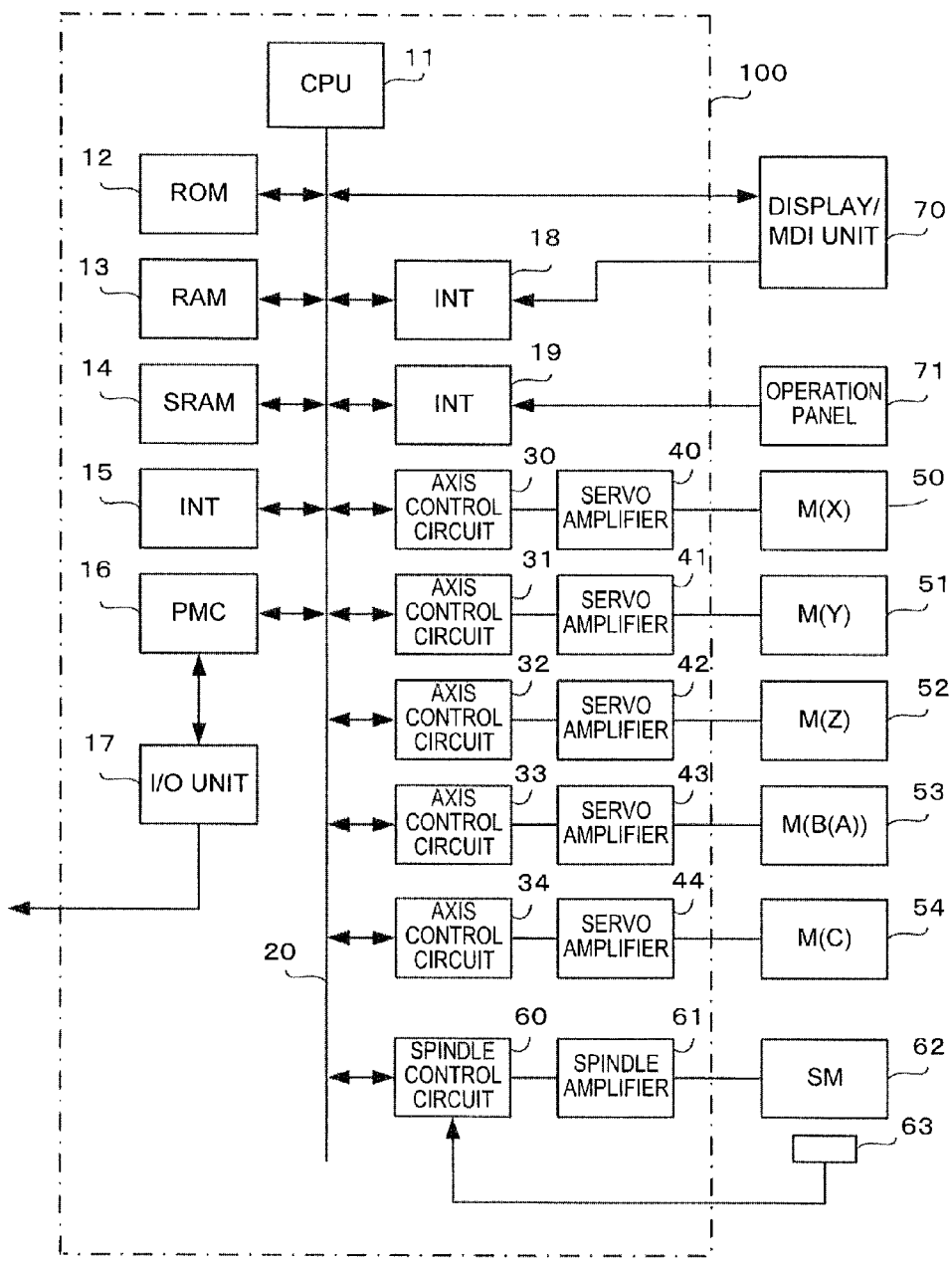
FIG. 15 is a main block diagram of a control device.

FIG. 15 is a block diagram illustrating a main part of the control device.

A CPU 11 is a processor that entirely controls the numerical control device 100. The CPU 11 reads a system program stored in a ROM 12 via a bus 20, and controls the entire numerical control device according to the system program. A RAM 13 stores a temporary calculation data item or a display data item and stores various data items input from an operator via a display/MDI unit 70.

An SRAM memory 14 is configured as a non-volatile memory which is backed up by a battery (not illustrated) and is maintained in a storage state even when the numerical control device 100 is turned off. The SRAM memory 14 stores a processing program read via an interface 15 or a processing program input via the display/MDI unit 70. Further, the ROM 12 previously stores various system programs for executing a process for an automatic operation or a process for an edit mode necessary for creating and editing the processing program.

A processing program including a vector sequence data item and an instruction point sequence data item created by using a CAD/CAM device or a simulation device are input via the interface 15, and are stored in the SRAM memory 14. A processing program having a tool-direction instruction correction mode is also stored in the SRAM memory 14.

Further, the processing program that is edited inside the numerical control device 100 may be stored in an external storage device via the interface 15. A programmable machine controller (PMC) 16 outputs a signal to a working machine assistance device such as an actuator including, for example, a tool exchange robot hand by the sequence program stored in the numerical control device 100 via the I/O unit 17 so as to control the working machine assistance device. The PMC 16 receives signals of various switches of an operation panel disposed in a main body of a working machine, performs a necessary signal process, and transmits the result to the CPU 11.

The display/MDI unit 70 is a manual data input device including a display or a keyboard, and the interface 15 receives an instruction and a data item from a keyboard of the display/MDI unit 70 and transmits these to the CPU 11. An interface 19 is connected to an operation panel 71 including a manual pulse generator and the like.

Axis control circuits 30 to 34 of the axes receive the movement instruction amount of the axes from the CPU 11, and output the instructions for the axes to servo amplifiers 40 to 44. The servo amplifiers 40 to 44 receive the instructions, and drive servo motors 50 to 54 of the axes. The servo motors 50 to 54 of the axes include position/speed control detectors, and feedback position/speed feedback signals from the position/speed detectors to the axis control circuits 30 to 34, thereby performing a position/speed feedback control.

The servo motors 50 to 54 are used to drive the X, Y, Z, B (A), and C axes of the five-axis processing machine. Further, a spindle control circuit 60 receives a main axis rotation instruction, and outputs a spindle speed signal to a spindle amplifier 61. The spindle amplifier 61 receives a spindle speed signal, and rotates a main axis motor 62 at an instructed rotation speed. A position coder 63 feeds back a return pulse to the spindle control circuit 60 while being synchronized with the rotation of the main axis motor 62 so as to perform a speed control.

The invention claimed is:

1. A numerical control device configured to control a five-axis processing machine including three linear axes and two rotation axes and configured to process a workpiece attached to a table using a tool side surface, the numerical control device comprising:

an instruction reading unit configured to read a movement path instruction of the linear axis, a relative movement speed instruction between the workpiece and the tool, a tool-direction instruction as a tool direction with respect to the table, and a tool length;

a tool-direction correction tolerance setting unit configured to set a tool-movement-direction tolerance in the tool direction in which the tool moves and a processing-surface-normal-direction tolerance in a process-surface-normal direction as threshold values for correcting the tool direction;

a tool-direction instruction correction unit configured to correct the tool-direction instruction so that the tool-direction instruction becomes within the tool-movement-direction tolerance and within the processing-surface-normal-direction tolerance that have been set by the tool-direction correction tolerance setting unit, when the tool-direction instruction is corrected so that a change amount in the tool direction and a change amount in the linear axes are proportional;

an interpolation unit configured to obtain each axis position for every interpolation period so that a tool center point moves along an instructed movement path at an instructed relative movement speed based on the relative movement speed instruction, the movement path instruction, and the tool-direction instruction corrected by the tool-direction instruction correction unit; and a unit configured to drive each axis motor so that the axis motor moves to each axis position obtained by the interpolation unit, wherein when a tool-direction instruction correction mode is instructed, the instruction reading unit estimates a predetermined number of blocks as a correction subject program instruction until the cancellation of the tool-direction instruction correction mode is instructed, and the tool-direction instruction correction unit corrects the tool-direction instruction of the correction subject program instruction, and wherein the tool-direction instruction correction mode is instructed by a G-code command and the cancellation of the tool-direction instruction correction mode is instructed by a different G-code command.

2. The numerical control device according to claim 1, wherein the tool-direction instruction is instructed as a tool-direction vector and the tool-direction instruction correction unit corrects the instructed tool-direction vector.

3. The numerical control device according to claim 1, wherein the tool-direction instruction correction unit converts the positions of the two rotation axes that have been instructed as the tool-direction instruction into a tool-direction vector, corrects the converted tool-direction vector, and reversely converts the corrected tool-direction vector into the positions of the two rotation axes.

* * * * *